United States Patent [19]

Kelley

[11] Patent Number: 4,650,080

[45] Date of Patent: Mar. 17, 1987

[54] VIDEOCASSETTE DISPLAY RACK

[76] Inventor: Richard Kelley, 1911 W. Division St., Chicago, Ill. 60622

[21] Appl. No.: 726,042

[22] Filed: Apr. 23, 1985

[51] Int. Cl.[4] .............................................. A47G 19/08
[52] U.S. Cl. ......................................... 211/41; 211/88
[58] Field of Search ..................... 211/88, 96, 126, 81, 211/86, 168, 41; 312/11, 14, 248; 248/314, 131, 248/145

[56] References Cited

U.S. PATENT DOCUMENTS

| | | | |
|---|---|---|---|
| 613,231 | 11/1898 | Bennett | 211/126 |
| 935,730 | 10/1909 | Bacon | 211/96 X |
| 1,358,833 | 11/1920 | Dolman | 312/13 |
| 2,974,807 | 3/1961 | Fürrer | 211/126 |
| 3,017,999 | 1/1962 | Cano | 211/169 X |
| 3,207,318 | 9/1965 | Gilbert | 211/40 |
| 3,489,475 | 1/1970 | Boyce et al. | 312/14 X |
| 3,647,076 | 3/1972 | Heimann | 211/88 |
| 3,760,952 | 9/1973 | White | 211/168 |
| 4,131,203 | 12/1978 | Bridges | 211/126 X |
| 4,274,687 | 6/1981 | Bayles et al. | 211/126 X |
| 4,368,934 | 1/1983 | Somers | 312/14 X |

FOREIGN PATENT DOCUMENTS

| | | | |
|---|---|---|---|
| 1384367 | 11/1964 | France | 211/96 |
| 357706 | 12/1961 | Switzerland | 211/126 |
| 2037158 | 7/1980 | United Kingdom | 211/96 |

Primary Examiner—Robert W. Gibson, Jr.
Assistant Examiner—Sarah A. Lechok Eley
Attorney, Agent, or Firm—Laff, Whitesel, Conte & Saret

[57] ABSTRACT

A novel device for storing and displaying videocassette packages is disclosed. The device includes a series of videocassette holders which are pivotably mounted to a stock shelf. The device allows at least three sides of each videocassette package to be viewed without direct handling, and provides comparatively great package storage density.

8 Claims, 4 Drawing Figures

U.S. Patent   Mar. 17, 1987   4,650,080
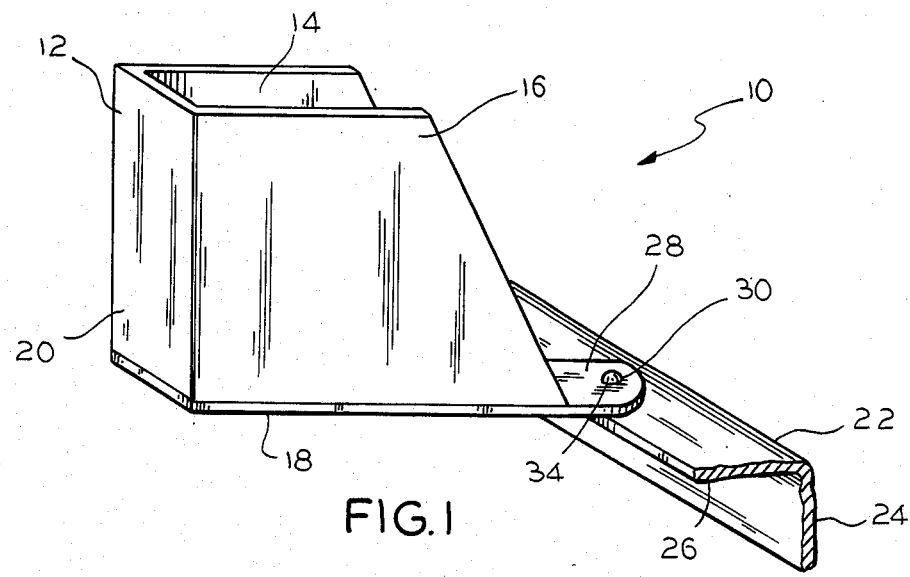
FIG.1
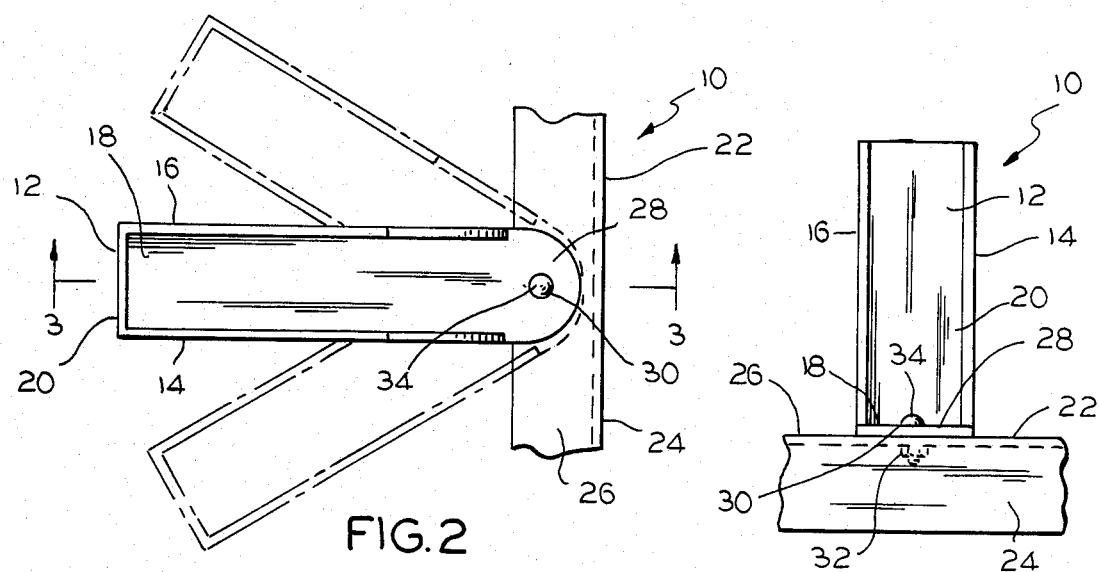
FIG.2
FIG.4
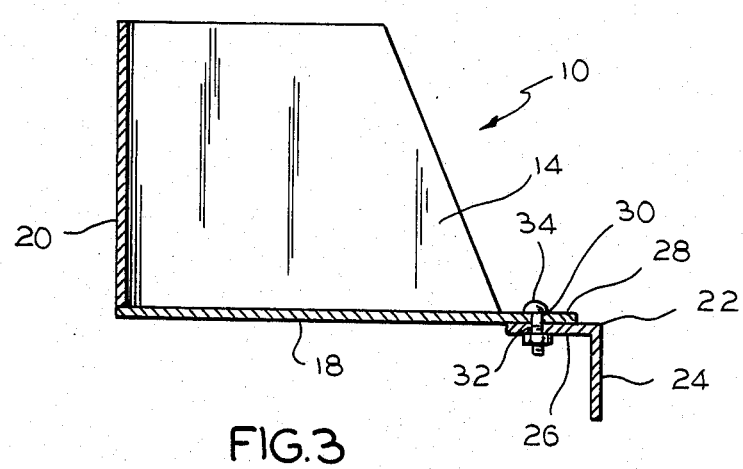
FIG.3

VIDEOCASSETTE DISPLAY RACK

BACKGROUND

1. The Field of the Invention

The present invention relates to an improved storage system. More particularly, this invention relates to a device for storing and displaying videocassettes.

2. Brief Description of the Background Art

Videocassette machines are available in varying standards. Machines are presently being produced for VHS, Beta and professional formats. These formats refer primarily to cassette configurations and tape width. There are machines produced for these formats which operate in both the record and play modes, and which operate in a play mode only. Owners of each of these machines, which will hereinafter be generically referred to as "VCR's" (videocassette recorders) may properly use the present invention.

VCR sales have steadily increased from the date of their inception to today at an unprecedented rate. This is due in part to a continual trend of reduced VCR prices, and also to increased availability of pre-recorded cassette tapes. Individual users may both record their own tapes as desired or purchase pre-recorded tapes from retail stores. In either event, users often maintain substantial home libraries. Individuals may also lease individual tapes from rental stores. Therefore, it is seen that both consumers and retailers have a need for efficiently managing their VCR tape inventories.

Tape storage has primarily been through conventional shelf type systems. Typically a series of deep shelves are employed which accent tape packages vertically along their bottom edges. The packages are oriented perpendicularly to the shelf wall. This method, which stacks packages front-to-back, allows users to view each package's spine. Package spines are used to locate internal coding, particularly in large libraries. This coding usually relates to location of film storage and film title. However, neither the fronts of the packages, which contain attention-grabbing color graphics, nor the rears of the packages, which contains story lines, are visible without removing the videotapes from the shelves.

Alternatively, a series of shallow shelves may be employed which accept tape packages vertically, as before, but oriented parallel to the shelf wall. Although this method of storage and display is exceedingly wasteful of display space, it appears to be the method most often used, particularly in retail stores. Probably, it is because this method of storage, which places each package edge to edge, allows users or customers to view the package's vivid color graphics. However, neither the story lines on the rears of the packages, nor any coding on the spines are visible without removing the packages from the shelves.

In each instance above, the required frequent removal of the tapes to review the unexposed sides damages and finally destroys the packages. The tape codes, graphics and print quickly become smudged and dirty. Attempts to clean the dirt deteriorate the paper boxes further, until additional handling simply results in tears and shredding along box creases and edges. The damage requires cellophane taping, or some similar repair method, which only attracts yet more dirt and finally yellows and cracks.

SUMMARY OF THE INVENTION

It is a specific object of this invention to provide a videocassette racking device which allows a user to completely view three sides of the videocassette package.

It is an object of this invention to provide a videocassette racking device which protects videocassette packages, allowing them to resist damage from handling.

It is another specific object of this invention to provide a videocassette racking device which requires only a minimal amount of display space.

It is another object of this invention to provide a videocassette racking device which stores and displays virtually any format of VCR tape.

In a broad embodiment therefore, these objects and others are provided by a novel racking device. The device provides a linear arrangement of individual transparent cassette holders. Each individual holder can be pivoted to view the desired portions of the cassette packages. Multiple linear arrangements of the devices may be provided on atop another.

BRIEF DESCRIPTION OF THE DRAWINGS

FIG. 1 is a partially sectional perspective view of the present invention;

FIG. 2 is a plan view looking up at the bottom of the present invention, showing the pivoting motion of the cassette holder in phantom detail;

FIG. 3 is a sectional side elevation of the present invention taken generally along the line 3—3 of FIG. 2; and FIG. 4 is a rear elevation of the present invention.

DETAILED DESCRIPTION OF THE INVENTION

The present invention provides a linear arrangement of individual transparent cassette holders. Each individual holder can be pivoted as desired, to view varying portions of the cassette packages without unneccessary handling of the packages. In order that this invention may be more easily understood, the following description will be given by way of illustration only.

A preferred embodiment of the inventive rack is disclosed in the FIGS. 1–4, generally designated as rack 10. Rack 10 includes numerous cassette holders 12. Cassette holder 12 is a four-sided container including left and right sides 14, 16, respectively, bottom 18, and front 20. A videocassette package is placed vertically in holder 12, spine edge out, towards front 20. As seen in FIG. 1, holder 12 is open along the top and the rear edges. This allows videocassette packages of widely varying heights and depths to be accomodated. Holder 12 panels 14, 16, 18, 20 are preferentially made of any rigid material, including but not limited to common transluscent thermosetting plastics. This allows the user to view all sections of the individual cassette package being considered. If panels 14, 16, 20 are produced from an opaque material, transluscent windows should be provided within panels 14, 16, 20 in order to provide the same effect.

Cassette holder 12 is attached to stock shelf 22, which stock shelf 22 is in turn mountable along any vertical surface. Most often, shelf 22 will be mounted to a suitable wall. Stock shelf 22 is preferentially produced from angle stock. In this instance, a vertical section 24 is provided for mounting shelf 22 to the vertical surface and a horizontal section 26 is provided for mounting holder 12 to shelf 22. Shelf 22 may be of any rigid material, such as metal, wood, plastic and the like.

Cassette holder 12 is mounted to horizontal section 26 of shelf 22 by mounting tab 28. Tab 28 is preferentially a coplanar extention of bottom 18. Mounting tab 28 is provided with mounting tab aperture 30, which corresponds with a stock shelf aperture 32 located within horizontal section 26. Shelf apertures 32 are provided at intervals along horizontal section 26, as will be explained in detail hereinbelow. Throughgoing pin 34 is provided, which pin 34 passes through each aperture 30, 32 and secures holder 12 to shelf 22. Pin 34 may be of any conventional retaining device such as rivets, bolts, grommets and the like. This arrangement allows cassette holder 12 to be pivoted about the axis of pin 34 as clearly seen in phantom detail in FIG. 2.

Preferentially, cassette holder 12 may be configured in proportions to exactly retain a given VCR format tape package. In lieu of this, front 20 and bottom 18 may, however, be dimensioned so as to retain the largest cassette tapes, and so, retain virtually any cassette tape. In the prior event, where holders 12 are individually sized, it would be of particular benefit to provide that pin 34 be of a releasable fastner type, so as to allow holder 12 to be replaced as required with another holder 12 of more appropriate size for a given application.

Thus it is seen how a racking system for virtually any items, but particularly videocassettes, has been produced. The racking system allows an individual videocassette package to be viewed on its front and back sides, as well as along its spine. The system is further particularly effective in that an individual user can personally select a preferred videocassette storage density.

By providing several models of stock shelves 22 with shelf apertures 32 located at varying distances, any user may select the number of videocassettes he wishes to display in a given area. Of course, the greater the distance between neighboring apertures 32, the fewer cassette holders 12 will be accomodated within a given stack shelf 22. In this instance however, i.e., with a comparatively greater distance between shelf apertures 32, a greater degree of holder 12 pivoting is available. The degree of holder 12 pivoting is limited by an individual holder 12 being fouled by its most adjacent neighbor. The larger the degree of pivoting, the easier it is for a user to view the graphics though right side 16 and the text through left side 14. It has been determined that an effective configuration is to locate shelf apertures 32 at spacings between 1½ and 3 inches, particularly at 1¾ inches.

It should be understood that various modifications can be made to the preferred embodiments disclosed herein without departing from the spirit and scope of the invention or without the loss of its attendant advantages. Thus, other examples applying the principles described herein are intended to fall within the scope of the invention, provided the features stated in any of the following claims, or the equivalent of such be employed.

I claim:

1. A device for simultaneously supporting and displaying videocassettes having a spine and two laterally extending display panels and a flat planar bottom comprising:

shelf means for mounting said device to a vertical surface;

said device further comprising a plurality of support means, each of said support means adapted to engage and hold videocassettes at the flat planar bottom of each said videocassette to display said videocassettes, each said support means defined by a plane at the bottom of said support means, said plane contacting and supporting said flat planar bottom of each said videocassette;

each said support means including at least one upwardly open portion for easy vertical insertion and removal of said videocassettes in and from said support means; and single attachment means connected to each said support means at the bottom of each said support means pivotally attaching each said support means to said shelf means, said support means and said videocassettes being pivotally cantilevered about a vertical axis in relation to said shelf means above the plane of the bottom of said support means.

2. The device for supporting and displaying videocassettes of claim 1 including a vertically disposed front portion attached to said bottom portion extending adjacent a portion of the spine of said videocassette, a pair of substantially parallel laterally extending outer walls, each joining said bottom portion and said front portion and extending adjacent a portion of the side display panels of said videocassette, and an attachment tab extending outwardly from the bottom portion of said support means and including attachment means adjacent the outer end thereof to pivotally attach said support means to said shelf means to provide said cantilever support below said videocassette.

3. The device for supporting and displaying videocassettes of claim 2 wherein said stock shelf means includes a plurality of serially aligned attachment means adapted to correspond and join with said attachment means on said support means to provide said pivotal attachment means.

4. The device for supporting and displaying videocassettes of claim 3 wherein said stock shelf attachment means are spaced equidistantly apart.

5. The devicde for supporting and displaying videocassettes of claim 4 wherein said stock shelf attachment means are equally spaced a distance apart in the range of one and one half inches to three inches.

6. The device for supporting and displaying videocassettes of claim 4 wherein said stock shelf attachment means are equidistantly located one and three-quarters inches apart.

7. The device for supporting and displaying videocassettes of claim 1 wherein said stock shelf means extends horizontally across said vertical surface.

8. The device for supporting and displaying videocassettes of claim 7 wherein said stock shelf means comprises an angle piece having two co-extensive arms formed at substantially right angles to each other, wherein one of said arms is adapted to mount said stock shelf means to said vertical surface, and the other of said arms forms a horizontal surface for attaching said support means to said stock shelf means.

* * * * *